United States Patent
Bril

[19]

[11] Patent Number: 6,072,530
[45] Date of Patent: Jun. 6, 2000

[54] FLICKER FILTER AND INTERLACER IMPLEMENTED IN A TELEVISION SYSTEM DISPLAYING NETWORK APPLICATION DATA

[75] Inventor: Vlad Bril, Campbell, Calif.

[73] Assignee: TeleCruz Technology, Inc., San Jose, Calif.

[21] Appl. No.: 09/001,304

[22] Filed: Dec. 31, 1997

[51] Int. Cl.[7] ....................................................... H04N 7/01
[52] U.S. Cl. .......................... 348/447; 348/446; 348/910
[58] Field of Search .................................. 348/446, 447, 348/445, 441, 910, 607, 615

[56] References Cited

U.S. PATENT DOCUMENTS

| | | | |
|---|---|---|---|
| 5,327,156 | 7/1994 | Masukane et al. | 345/113 |
| 5,355,328 | 10/1994 | Arbeiter et al. | 364/724.1 |
| 5,510,843 | 4/1996 | Keene et al. | 348/447 |
| 5,742,349 | 4/1998 | Choi et al. | 348/447 |
| 5,781,241 | 7/1998 | Donovan | 348/441 |

*Primary Examiner*—Victor R. Kostak
*Attorney, Agent, or Firm*—Law Firm of Naren Thappeta

[57] ABSTRACT

A television system (TV) with an interlaced display screen for displaying network application data. A flicker filter is preferably implemented as an infinite impulse response (IIR) filter to eliminate sharp transitions in the network application data images. A random access memory is used to store the lines of the filtered images and any adjacent lines used for the filtering operation. Alternate lines of the filtered images are retrieved from the random access memory to provide an interlaced image of the filtered network application data images. The interlaced images are displayed on an interlaced display unit of a television system.

8 Claims, 8 Drawing Sheets

FLICKER FILTER AND INTERLACER IMPLEMENTED IN A TELEVISION SYSTEM DISPLAYING NETWORK APPLICATION DATA

RELATED APPLICATIONS

The present application is related to the following co-pending U.S. patent applications, which are incorporated by reference in their entirety herewith:

1. Patent Application entitled, "A Method and Apparatus for Enabling a User to Access Data Network Applications from a Television System", Filed Jun. 2, 1997, Ser. No. 08/867,203, (hereafter "RELATED APPLICATION 1);
2. Patent Application Entitled, "A Circuit and Method for Generating a Clock Signal Synchronized with Time Reference Signals Associated with Television Signals", Filed on even date herewith, Serial Number Unassigned, (hereafter "RELATED APPLICATION 2);
3. Patent Application entitled, "A Method and Apparatus for Reducing Flicker in the Television Display of Network Application Data Displayed with Images Encoded in a Television Signal", Filed on even date herewith, Serial Number Assigned, (hereafter "RELATED APPLICATION 3"); and
4. Patent Application Entitled, "A Method and Apparatus for Refreshing a Display Screen of a Television System with Images Representing Network Application Data", Filed on even date herewith, Serial Number Unassigned, (hereafter "RELATED APPLICATION 4").

BACKGROUND OF THE INVENTION

1. Field of the Invention

The present invention relates to television systems, and more specifically to a method and apparatus for displaying network application data having a non-interlaced format on a display unit of a television system supporting interlaced displays.

2. Related Art

Since the 1940s, television systems have been increasingly embraced by many households, particularly in the industrial countries. Television systems have generally been used to view broadcasts made in distant parts of the world or to view a pre-recorded program from a video cassette player (VCP). A significant proportion of the households presently have at least one television set in their homes. Television displays are presently available or anticipated to be widely available in analog (e.g., NTSC analog signal displayed on a CRT based display screen) as well as digital technologies (e.g., HDTV).

In parallel, data network applications (hereafter "network applications") have experienced a phenomenal growth since the mid-1980s. Network applications such as web-browsing and electronic mail have had a fundamental impact on the manner in which information is exchanged and disseminated. These network applications have particularly been implemented for and used along with computer systems such as personal computer systems, work-stations, and the like.

At least in view of the considerable presence of the television systems in the households, it may be desirable to provide the capability to access the network data applications on television systems. Examples of such television systems are described in RELATED APPLICATION 1 and RELATED APPLICATION 2.

One problem with the display of network application on television display screens is that television display units are typically designed to display images of interlaced format. In contrast, images representing network application data may be available in interlaced format.

Therefore, what is needed is a circuit and method which enables the display of network application data images available in non-interlaced format on a display unit of a television system supporting interlaced display format.

In addition, the circuit and method may need to reduce flicker which may otherwise be present in the display of network application data on television system displays. Flicker is usually a result of sharp transitions in color (e.g., the display may include alternative scan lines of black and white) typically present in network application data images. As is well known in the art, flicker on television displays is undesirable as it can cause considerable strain on human eyes.

Therefore, what is also needed is a circuit and method which enable the display of network application data without much flicker.

In addition, the above described requirements may need to be implemented in a cost-effective manner as television systems may be targeted for consumer applications, where low cost is usually an important factor.

SUMMARY OF THE INVENTION

The present invention is directed to a flicker filter and an interlacer which enable the display of network application data on an interlaced display unit of a television system. The flicker filter receives original pixel data elements representative of a non-interlaced image of the network application data, and filters the image to generate filtered pixel data elements representing a smoothened non-interlaced image. During the filtering operation, the flicker filter uses a previously generated filtered line, a previously retrieved line (original pixel data elements) of the non-interlaced image, and a present line of the non-interlaced image to generate a new filtered line. The flicker filter uses a buffer to store the previously retrieved line and the previously generated filtered line. Due to the flicker filtering, sharp transitions are reduced or substantially eliminated from the filtered image. As a result, flicker may be substantially eliminated from the eventual display.

Alternate lines of the filtered lines are retrieved from the buffer in accordance with the present invention. The alternate lines form an interlaced image suitable for display on interlaced display units of television systems.

In an embodiment of the present invention, a buffer having sufficient memory to store two lines of data is chosen. The two lines are used to store a previous original scan line and a previously generated filtered line. The stored lines are retrieved to generate the interlaced images.

Thus, the present invention eliminates (or reduces) flicker in the display of network application data on an interlaced display unit of a television system by filtering the pixel data representing an image of the network application data.

The present invention enables network application data to be displayed on interlaced display units by providing images in interlaced format.

The present invention reduces the overall cost of a television system by achieving both the filtering and interlacing functions using a shared buffer.

The present invention may allow the cost to be further reduced by enabling the filtering and interlacing functions to be achieved using buffer having sufficient memory to store two lines of pixel data elements.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention is directed to a flicker filter which smoothens any sharp transitions in images representing network application data (i.e., data received from external sources such as world-wide web). Smoothing of the images is accomplished by filtering adjacent lines of the non-interlaced image. To minimize the number of accesses of network application data (stored in a memory), the flicker filter maintains an internal memory. The memory is used to store pixel data elements of the adjacent lines and any filtered data representing a weighted average of several adjacent lines.

As the data representing the image is filtered using adjacent lines of the non-interlaced image, sharp transitions are removed from the final image. As a result, flicker is substantially minimized or eliminated.

In addition, the present invention allows for providing interlaced images of network application data without substantial additional hardware requirements. Specifically, filtered data is retrieved from the memory in an innovative manner such that the retrieved data represents interlaced images. Accordingly, network application data can be displayed on interlaced display units in a cost-effective manner.

The present invention can be understood in the context of an example environment. According, the present invention is explained below with reference to an example environment.

2. Example Environment

In a broad sense, the present invention can be implemented in any television system having an interlaced display unit. For purposes of illustration, the invention will be explained in the context of a television system implemented using analog (e.g., using CRTs) technology. However, it will be apparent to one skilled in the relevant arts how to implement the present invention with digital technologies (e.g., HDTV supporting interlaced format) without departing from the scope and spirit of the present invention by reading the description herein.

Figure 1:
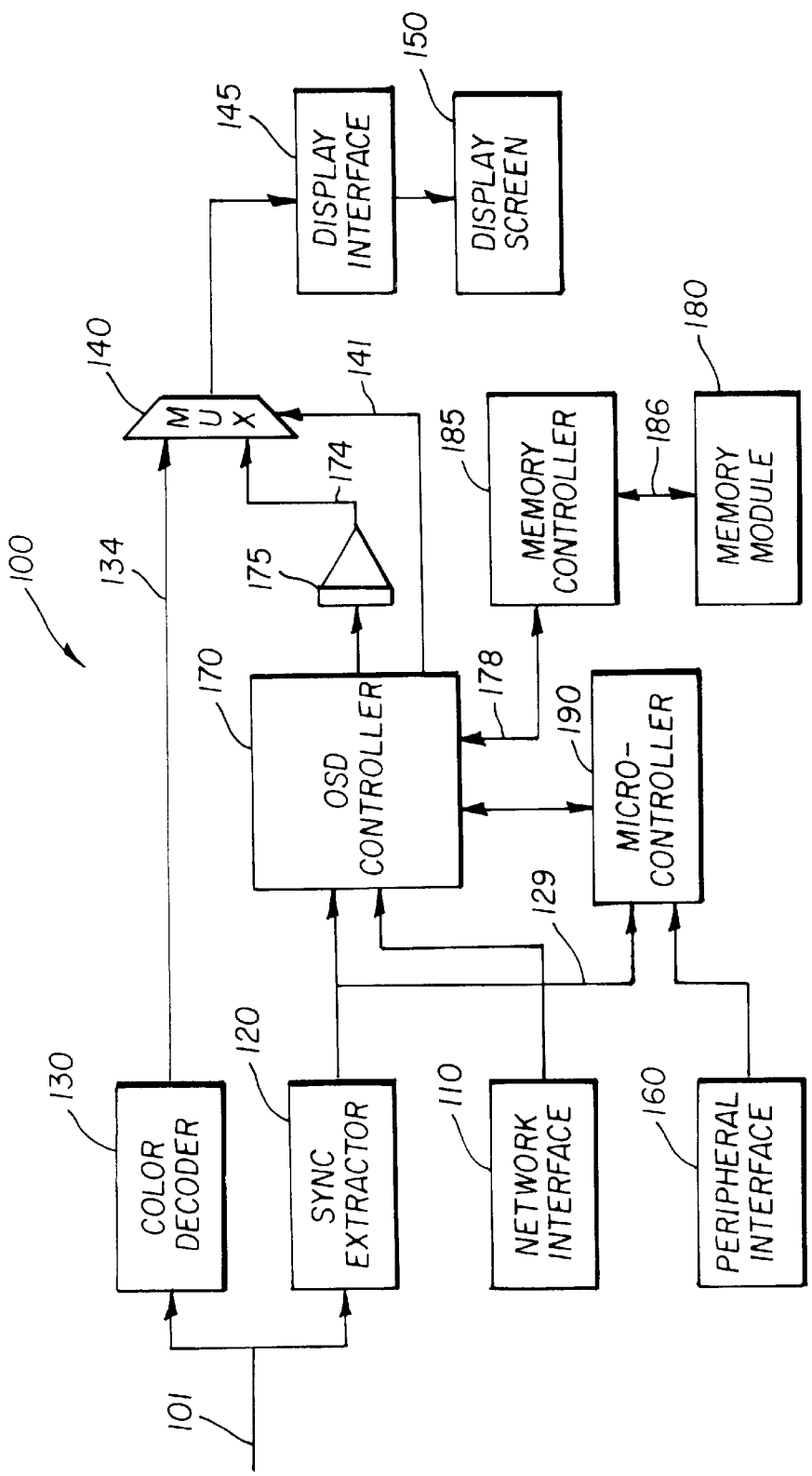
FIG. 1 is a block diagram illustrating an example implementation of a television system in accordance with the present invention.

FIG. 1 is a block diagram of an example television system (TV) 100 in which the present invention can be implemented. The operation, structure and use of television system 100 as relevant to the present invention will be explained here. However, one or more embodiments of television system 100 are explained in further detail in RELATED APPLICATION 1 and RELATED APPLICATION 2, which are incorporated by reference in their entirety herewith.

Television system 100 comprises sync extractor 120, color decoder 130, multiplexor 140, display interface 145, display screen 150, peripheral interface 160, on-screen-display (OSD) controller 170, digital-to-analog converter (DAC) 175, memory controller 185, memory module 180, and micro-controller 190. Micro-controller 190 generates control and clocking signals to coordinate and control the operation of the remaining components of television system 100. For purpose of clarity, only some of the connections from micro-controller 190 are shown in FIG. 1. Each of the components of TV 100 are explained in further detail below.

Network interface 110 receives network application data from an external source. Network interface 110 can be a telephone modem, cable modem or any other interface which is designed to operate with the external source. The external source can be, for example, a dial-up connection (point-to-point) or a network connection implemented using a communication protocol. Even though network interface 110 is shown as a single block, it should be understood that it may contain more than one unit depending on the specific requirements of the individual television system.

Network interface 110 receives data corresponding to a network application such as web-browsing, electronic mail in a known way. The data may be received in one of known formats such as ASCII, HTML, VRML etc. which are encoded as electrical signals. Network interface 110 sends signals representative of the network application data to OSD Controller 170.

OSD Controller 170 receives network application data from network interface 110, and stores the received data in memory module 180 by interfacing with memory controller 185. Memory module 180 may include one or more physical memory units as suitable for the specific requirements for which TV 100 is designed for. Memory controller 185 interfaces with OSD controller 170, and enables OSD controller 170 to store and retrieve data from memory module 180. The implementation of memory controller 185 depends on the specific technology chosen for memory module 180, and can be provided integral to a memory storage unit. Some features of an embodiment of memory controller 185 are described in RELATED APPLICATION 4.

OSD Controller 180 transforms the network application data as is suitable for storage and retrieval from memory module 180. The storage scheme may include conventions to represent the area on which network application data is to be displayed. In one example embodiment, OSD controller 180 stores the network application data as a "bit map" encoded in RGB format in memory module 180 as illustrated with reference to FIGS. 3A and 3B, which are explained in further detail below.

OSD controller 170 may be designed to store other display entities as well. These display entities may provide additional capabilities or enhance the ease of use of television system 100. However these other display entities will not be described here as they may not be relevant to an understanding of the present invention. For the purpose of explaining the present invention, it will be assumed that OSD controller 170 stores only network application data in memory module 180. For details of other display entities which may be stored in memory module and the manner in which they are used, the reader is referred to RELATED APPLICATION 1.

Also, OSD controller 180 receives pixel elements of network application data image in a non-interlaced format from memory controller 185, but provides pixel elements corresponding to an image of an interlaced format. This conversion simplifies the overlay process between the television signal display and network application data display. In addition, OSD controller 180 filters the pixel data elements received to smooth out the network application data image. The data elements representing the smoothened image (i.e., without sharp transitions) is provided in the interlaced format. The manner in which the filtering and interlacing is performed in an embodiment is described in detail below.

Digital-to-analog converter (DAC) 175 receives the pixel data elements representing the smoothened image from OSD controller 170 and generates analog display signals on line 174 from the pixel data elements. Each pixel data element typically represents the color of a point on display screen 150 when line 141 indicates that network application data is to be displayed.

Sync extractor 120 and color decoder 130 receive a television signal from sources such as cable service providers, television (relay) stations, digital video disk players etc. The TV signal is generally received in a known format, for example, in NTSC composite video format. However, television signal can be any other signal including an interlaced display signal and corresponding synchronization signals. Decoder 130 extracts the interlaced display signal which is encoded in the television signal and provides the display signal to multiplexer 140 on display signal line 134.

Sync extractor 120 extracts (or generates) synchronization signals present in the television signal in a known way. The synchronization signals are provided to micro-controller 190 and OSD controller 170 to coordinate the network application data flow consistent with the reception of the television signal. In one embodiment (described in RELATED APPLICATION 2), the clock signal driving the OSD controller 170 are genlocked to the synchronization signals.

Multiplexor 140 receives the interlaced television signal and the analog display signals as inputs on lines 134 and 174 respectively, and selectively forwards one of the two inputs to display panel interface 145 under the control of select line 141. The select line is controlled by OSD controller 170 in one embodiment. As the two signals received on lines 134 and 174 correspond to the same point on display screen, the selection is performed on a point-by-point basis. The selection results in an overlay. Thus, the television signal display and network application data display are overlayed before a unified display is provided on display screen 150. From the description herein, it will be apparent that multiplexor 140 along with OSD controller 170 form a selection circuit to overlay the display entities displayed by television 100. In one embodiment, select line 141 is controlled by OSD Controller 170 and each multiplexor input corresponds to a single pixel on display screen 150.

Multiplexor 140 along with select line 141 operates to select between the television signal and the pixel data received on line 14. Even though the processing of television signal and network application data is explained with reference to RGB data, it should be understood that the present invention can be implemented using other data formats also without departing from the scope and spirit of the present invention.

In the description above, multiplexor 140 and DAC 175 operate as a selection circuit. The selection circuit operates in an analog domain in the sense that the inputs to multi-plexor 140 are in the form of analog signals. However, it should be understood that the selection can be performed in a digital domain as well without departing from the scope and spirit from the present invention. Such a digital operation is described in RELATED APPLICATION 1.

Display interface 145 receives display signals from multiplexor 140, and provides any signaling interface required for display on display screen 150. If display screen 150 is implemented as a CRT screen, display interface 145 generates electrical signals to control the scan circuitry usually associated with CRT screens. The design and implementation of display interface 145 depends on the specific technology chosen for display screen 150. The implementation of display interface 145 will be apparent to one skilled in the relevant arts. It is contemplated that the present invention can be implemented with technologies such as digital television systems (e.g., HDTV) and flat-panel based TVs, projection TVs based on DMD (digital mirror display), and the like.

Micro-controller 190 receives these synchronization signals on line 129 and configures the remaining components based on the synchronization signals. For example, micro-controller 190 causes the creation of bit-maps corresponding to the received network application data. In addition, micro-controller 190 ensures that the pixel data elements received on lines 134 (for television signal) and 178 (the overlayed image of display entities stored in memory module 180) correspond to the same point/pixel on display screen 150.

Peripheral interface 160 can include an interface for one or more peripherals. In one embodiment, interfaces are provided for push-buttons and infra-red remote. Push-buttons can be found on conventional television sets, and are generally used for functions such turning the television set ON/OFF, volume control etc. Infra-red remote interface operates in conjunction with remote control devices, which may be used for several functions such as television control (tuning, voice control, remote control etc.), enabling network applications etc. Devices such as key-boards which facilitate easy entry of ASCII data can be interfaced using infra-red interfaces. The implementation of these interfaces will be apparent to one skilled in the relevant arts.

Thus, in one embodiment, OSD controller 170 of the present invention retrieves the network application data from memory module 180 in a non-interlaced format, filters the received data to smoothen the image represented by the application data, and provides data representative of the smoothened image in an interlaced format. The data is converted into analog display signals. Multiplexor 140 selects either the analog display signals of network application data or television display signal for each point on the display screen. The selected signal is displayed on the corresponding point.

3. Storage in Memory Module in an Example Implementation

Figure 3A:
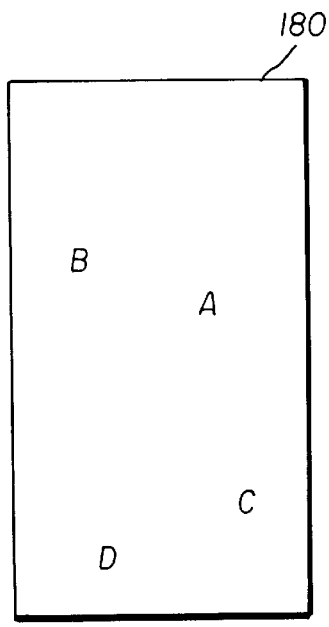
FIG. 3A is a block diagram of a memory module illustrating an example scheme for storing pixel data elements representative of network application data for display on a television display screen of FIG. 3B.

In an example implementation, network application data is stored in memory module 180 according to the display sought on display screen 150. Typically, a user specifies the portion on display screen 150 on which network application data is to be displayed and the portion on which television signal is to be displayed. Micro-controller 190 generates commands to store network application data in memory module to correspond to the user specification. Data is stored in memory module according to these commands. OSD controller 170 is designed to receive this data and generate a display in the area specified by the user. FIG. 3A illustrates the data format stored corresponding to a desired display illustrated in FIG. 3B. The structure and operation of OSD controller 170 which uses the data format will then be explained with reference to FIG. 4.

Figure 3B:
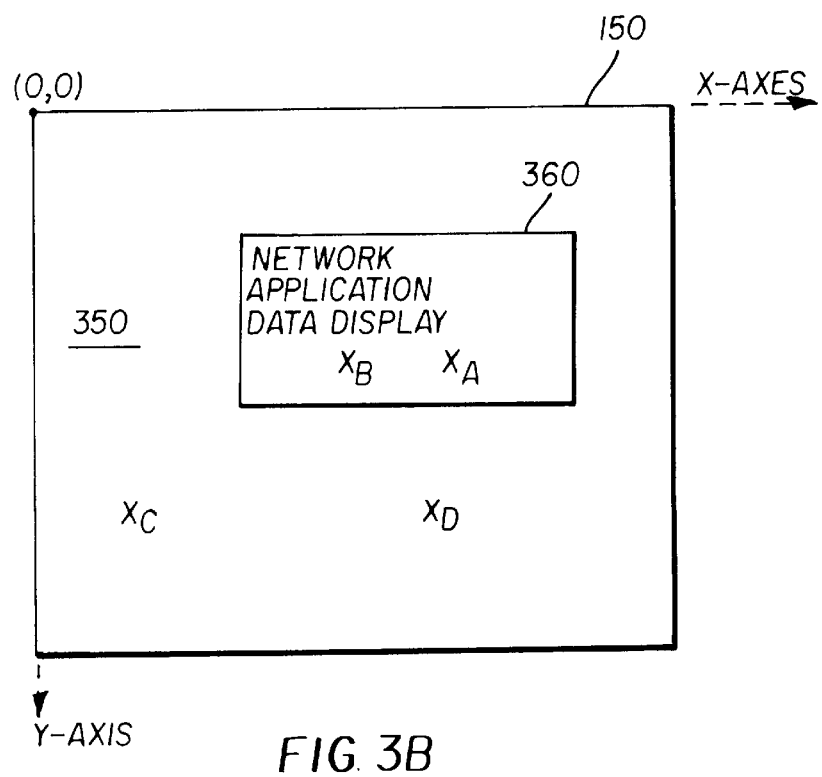
FIG. 3B is a block diagram illustrating an example display of network application data on a television display screen.

In FIG. 3B, network application data display 360 is shown on a portion of display screen 150. Network application data display 360 can occupy all the surface of display screen 150 if so specified by a user. If network application data display 360 does not occupy the whole surface of display screen 150, television signal display 350 can occupy the area outside of the network application data display 360. The displays shown in FIG. 3B are examples only. The television signal display and network data application can be combined in various ways, for example, as specified by a user. Some of the ways in which the display can be combined is explained in further detail in RELATED APPLICATION 1.

FIG. 3B includes points A, B, C, D which illustrates in combination with FIG. 3A one convention according to which network application data is represented in memory module 180. The stored data defines the manner in which network application data display is to be combined with television signal display. In FIG. 3A, memory module 180 is shown storing a bit map, with each bit position corresponding to a point on the display screen 150. The bit map can be stored as a surface, with each bit having a coordinate position. Each frame of the television signal also can be viewed as a surface with the same coordinate positions for like relative position in the surface. Thus, left right corner of display screen 150 is shown with X, Y coordinates of (0, 0).

Each bit/point/pixel stored in display memory can generally have a value to represent the display signals to be generated. In one embodiment, each point of the display is represented in pelletized 8 bits per pixel format. That is, the eight bits are latter mapped to a color (preferably in OSD controller 170 of FIG. 1).

Continuing with the description of FIGS. 3A and 3B, point values A, B, C, and D stored in memory 180 correspond to points A, B, C, D of FIG. 3B. Each value (pixel data element) stored in memory 180 is set to a value representing the color with which a corresponding point is to be displayed. However, if a television signal is to be displayed at the corresponding point, the value is set to a special value, termed transparent color. Thus, values corresponding to points C and D (on which the television signal is displayed) of FIG. 3B are set to the transparent color. These values can be set according to the area in which a user desires to have the network application data displayed.

The manner in which an implementation of OSD controller 170 uses the above convention to combine the network application data display with the television signal display is explained in detail below and in RELATED APPLICATION 1. The manner in which OSD controller 170 generates filtered interlaced displays in an embodiment of the present invention will be described below.

4. Example Implementation of OSD Controller

Figure 4:
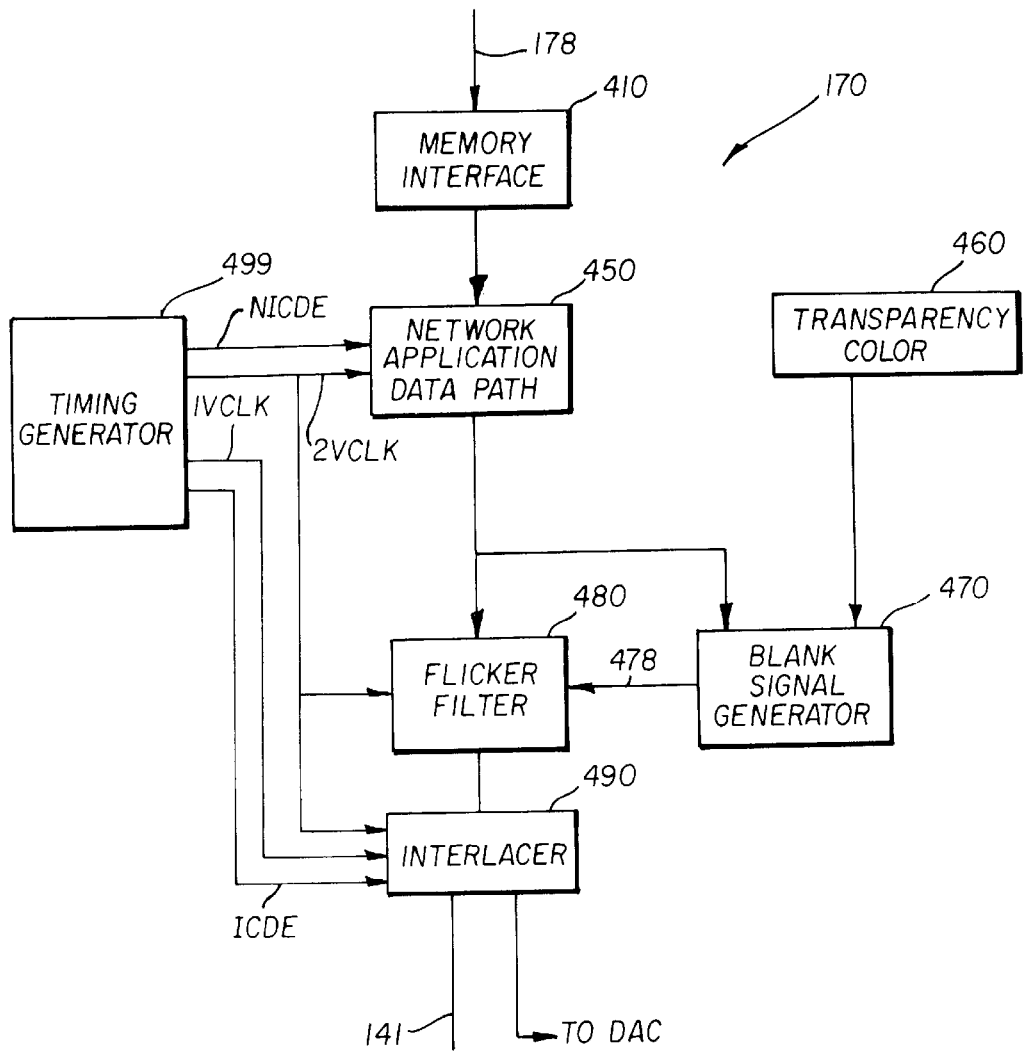
FIG. 4 is a block diagram of an example implementation of a on-screen display (OSD) controller illustrating the manner in which filtered data is provided in an interlaced format.

FIG. 4 is a block diagram illustrating an example implementation of OSD controller 170 comprising memory interface 410, transparency register 460, network application data path 450, blank signal generator 470, flicker filter 480, interlacer 490, and timing generator 499. If other display entities are stored in memory module 180, OSD controller 170 can include other components to process these other display entities. An example implementation processing such display entities is described in RELATED APPLICATION 1.

Memory interface 410 is designed to have the electrical and other protocol functions to interact with memory controller 185 and to provide the pixel data elements to data path 450. The output of memory interface 410 is coupled to the input of network application data path 450. Blank generator 470 and flicker filter 480 are coupled to the output of network application data path 450. Blank generator 470 is coupled to transparent color register 460. Interlacer 490 is coupled to the output of flicker filter 480. Timing generator 499 is coupled to all the other components of OSD controller 170, but only some of the connections are shown for clarity.

The operation of the components of OSD controller 170 can be appreciated by a broad understanding of the speeds at which the components operate. Broadly, network application data path 450 and flicker filter 480 are clocked to operate at high speed so as to generate all the pixel data elements representing a non-interlaced image. Interlacer 490 receives the pixel data elements at the high speed, but provides as output smaller set of pixel data elements representing an interlaced image. That is, during one frame of the television signal, pixel data elements representing all the odd lines are provided, and during an immediate frame, pixel data elements representing all the even lines are provided. Accordingly, the higher speed clock signal 2VCLK is shown connected to network application data path 450, flicker filter 480, and interlacer 490. The slower speed clock 1VCLK is shown connected to interlacer 490 only.

The individual components of OSD controller 170 are explained now in detail.

Data is received by network application data path 450, typically in response to commands from micro-controller 190 to memory controller 185. The commands include operations to store and retrieve data from memory module 180. Memory controller 190 can execute programs defined by data retrieved as a result of execution of the commands. Some of the retrieved commands cause data to be transferred to data path 450, and the transferred data may correspond to the pallette data stored in the respective data paths. The pallette data may be stored in another ROM (not shown).

The store commands cause data to be stored in memory module 180. Such data is typically stored to modify (or define) a corresponding surface. For example, if television 100 receives additional network data from an external source, the received data may be stored in memory module 180, preferably as a bit map. Continuing with the description of memory interface 410 with reference to FIG. 4, memory interface 410 retrieves pixel data elements upon receiving commands from network application data path 450. Each retrieved pixel data element corresponds to a specific pixel position on display screen 150.

Network application data path 450 receives multiple pixel data elements in each word from memory interface 410. Network application data path 450 then performs steps such as serialization to extract each pixel data element from the received word. For example, if network application data is encoded in 8 bpp format and if each received word includes 16 bits of pixel data, network application data path 440 serializes the 16 bits into two pixel data elements.

Network application data path 440 may further include a palette table to convert the 8 bits of pixel data into color data with more number of bits in a known way. For example, each pixel data element may be mapped into 5:6:5 or 6:6:6 RGB data. The pallette table in turn may be loaded (from an external ROM, not shown) by appropriate data in response to commands from micro-controller 190.

Network application data path 440 is shown operating using two clock signals 2VLCK and NICDE (non-interlaced composite display enable). The 2VCLK signal indicates that it operates at twice the frequency as the 1VCLK shown connected to interlacer 490. With the higher speed (frequency), the 2VLCK causes network application data path 440 to operate with pixel data elements representing images in a non-interlaced format The NICDE signal indicates the correct time for network application data path 440 to start the pipelines and continue processing the pixel data elements. The pixel data elements are provided to interlacer 490 as a result of such processing. The pipelines in network application data path 440 are operated such that there is adequate data flow to interlacer 490.

Blank signal generator 470 generates a blank signal. In one embodiment, blank signal generator 470 comprises a comparator, which compares the output of network application data path 450 with a transparency color stored in the programmable register 460. The output of the comparator is provided to multiplexor 140 on line 141. Thus, if the two input values to the comparator are detected to be equal, the blank signal is asserted, which causes multiplexor 140 to select the data provided by OSD controller on line 174. Otherwise, multiplexor 140 selects the television signal data received from encoder 130.

In one embodiment, blank generator 470 provides the blank signal to flicker filter 480 on bus 478. In turn, flicker filter 480 stores and/or transfers data bits representative of these signals correlated with the pixel data received from data path 450. Such a correlation allows OSD controller 170 to appropriately process corresponding portion (point) of television signal received in another path. In an alternative embodiment, the blank signals can be provided directly to the selection circuit.

Flicker filter 480 can filter the received pixel data element in one of several ways. The received pixel data elements shall be referred to as 'original pixel data elements' and the pixel data elements resulting from the filtering operation shall be referred to as 'filtered pixel data elements'. Filtering generally has the effect of smoothing the image eventually displayed. As a result of image smoothing, flicker may be reduced in the display of network application data on display screen 150. In one embodiment described below in detail, flicker filter 480 includes a buffer to store two or more lines of data. However, a different number of lines can be stored and used during filtering as will be apparent to one skilled in the relevant arts by reading the description provided herein.

Filtering may be performed relative to both previous lines and/or subsequent lines. In general, the data (corresponding to the adjacent lines) stored in the buffer are processed to remove (reduce) sharp transitions. For example, the a pixel data elements may be interpolated with adjacent pixel data elements to generate pixel data elements ("filtered pixel data elements"). These filtered pixel data elements are used for generating display signals as explained below. Also, flicker filter 480 also operates using 2VLCK signal to be able to process the larger number of pixel data elements present in the non-interlaced image. It should be noted that a new pixel data value is typically generated by the operation of flicker filter 480. Accordingly, the blank signal is generated before pixel data elements are processed by flicker filter 480.

Interlacer 490 receives pixel data elements representing a non-interlaced image from flicker filter 480, and provides as output alternate lines representing an interlaced image. Odd lines and even lines can generally be provided alternately. Each set of such alternate lines may be referred to as an interlaced frame. The conversion is performed as display screen 150 is designed to display an interlaced image. An embodiment of interlacer 490 which is integrated into the architecture of flicker filter 480 is described below.

The operation of interlacer 490 can be controlled by the timing signals generator 499. Specifically, ICDE (interlaced composite display enable), 2VCLK and 1VCLK signals are shown in FIG. 4 from time signals generator 499 to interlacer 490. 2VCLK signal is generated at twice the frequency of 1VCLK signal. 2VLCK signal enables interlacer 490 to receive the pixel data elements representative of the image in an non-interlaced format. 1VLCK signal enables interlacer 490 to generate pixel data elements representative of the same image in the interlaced format. ICDE is timed to cause interlacer 490 to generate each pixel data element which corresponds to a point represented by the television display signal portion received at multiplexor 140. As noted earlier, multiplexor 140 can select one of the two signals, which results in combining of the television signal image and network application data image. Several implementations of interlacer 490 will be apparent to one skilled in the art by reading the description provided herein.

The output of interlacer 490 is provided as an input to multiplexor 140 on line 174. As will be apparent from the description above, the output of interlacer 490 represents the network application data image in an interlaced format. In addition, the blank signal generated by data path multiplexor 460 is provided on signal line 141. One value of blank signal causes multiplexor 140 to select the television signal pixel data element received from encoder 130, and the other value of the blank signal line causes multiplexor 140 to select the pixel data element received from interlacer 490. Thus, the blank signal determines whether the television signal image or the network application data image is displayed on a pixel-by-pixel basis.

Timing signals generator 499 generates the clocking and control signals for different components of OSD controller 170. Timing signals generator 499 receives as input the HSYNC and VSYNC signals from the television signal, and generates the 1VLCK signals and display enable signals described herein. The 1VLCK signals and display enable signals are 'genlocked' to the television signal synchronization signal. Genlocking refers to the synchronization of one signal(s) to the other. It is generally important that the 1VLCK and display enable signals be locked accurately to the HSYNC and VSYNC signals. Without such locking, the network data display may be seen to be moving with respect to the television signal display. Such movement (called jitter) is stressful on the human eye, and thus undesirable. When the signals are genlocked properly, jitters can be minimized (or eliminated). An embodiment for achieving such genlock is described in RELATED APPLICATION 2.

Thus, timing signals generator 499 generates timing signals which are genlocked with synchrnization signals present in the received television signals. These signals are used to generate network application data in a non-interlaced mode. This retrieved data is filtered to smoothen (eliminate sharp transitions) in the network application data image. The data corresponding to the smoothened image is then provided in an interlaced format suitable for display on a interlaced television signal display.

Thus, OSD controller 170 generates signals representing filtered and interlaced image of the network application data. Primarily, flicker filter 480 and interlacer 490 operate to generate such signals. Flicker filter 480 and interlacer 490 can be implemented as a separate circuits. Alternatively, they can be integrated as one circuit in accordance with the present invention as described below.

5. Example Embodiment of Interlacer

Figure 5:
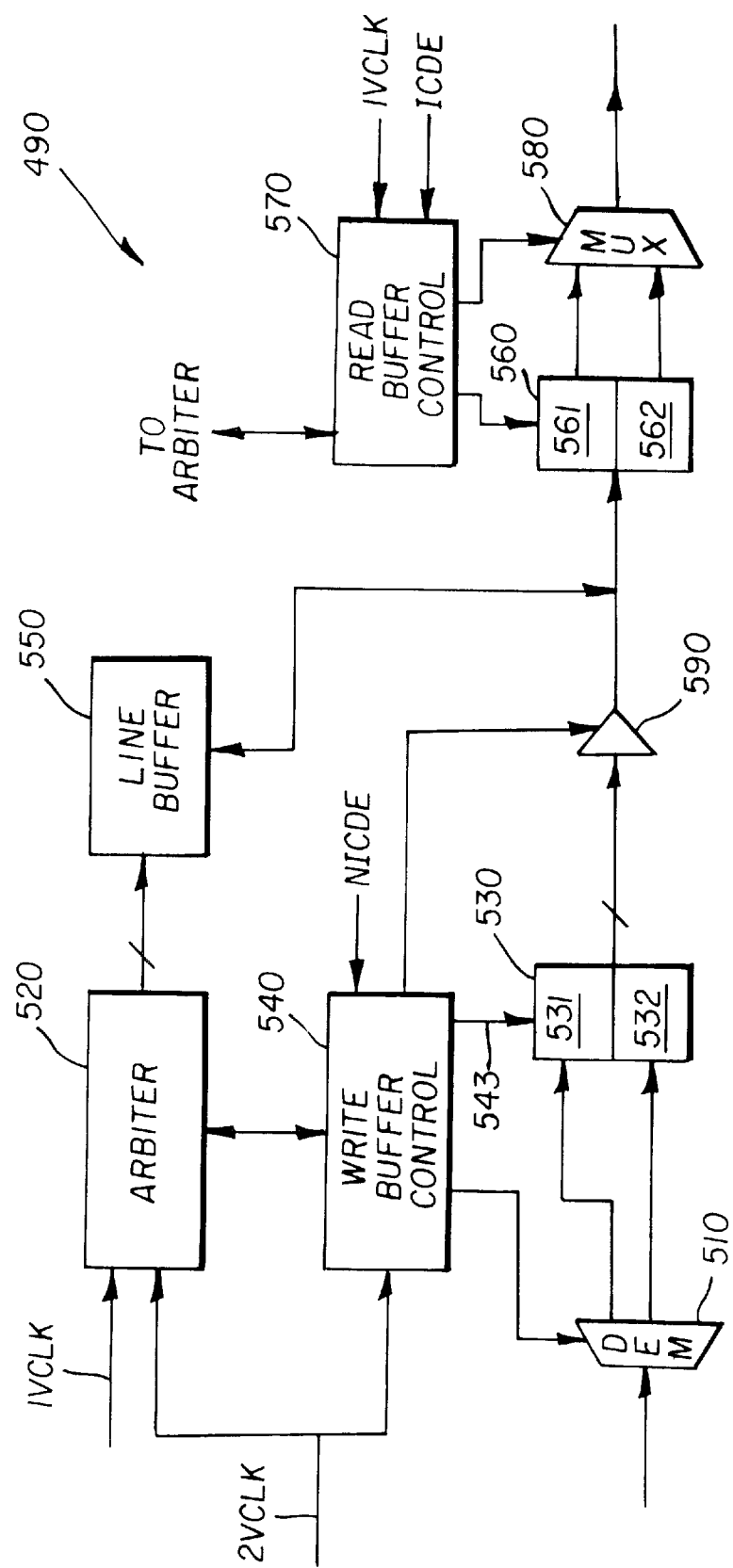
FIG. 5 is a block diagram of an example implementation of an interlacer which generates pixel data representing interlaced images from pixel data representing non-interlaced images.

FIG. 5 is a block diagram of interlacer 490 in an example implementation of the present invention. Interlacer 490 comprises demultiplexor 510, arbiter 520, write buffer 530, write buffer control 540, line buffer 550, read buffer 560, read buffer controller 570, demultiplexor 580, and tristate buffer 590. As will be explained, interlacer 490 receives filtered pixel data elements (from flicker filter 480) representing non-interlaced images and generates pixel data elements representing non-interlaced images.

In one embodiment, line buffer 550 is implemented as a random access memory having sufficient storage to store two horizontal lines of pixel data elements. The word width (i.e., number of bits in each word) of line buffer 550 can be chosen to store data for two pixel data elements. As will be clear from the discussion below, such a memory size and word width enables data to be delivered from interlacer 490 at a desired rate while effectively resolving conflicts for reading and writing into line buffer 550. The remaining logic in interlacer 490 is implemented to operate with line buffer 550.

As the data output rate of interlacer 490 is only half that of the input rate when providing interlaced output, read operations can occur at half the frequency as that of write operations. Accordingly, write buffer control 540 and read buffer control 570 are coupled to 2VCLK and 1VCLK signals respectively. In one embodiment, 2VCLK and 1VCLK operate at frequencies of 25 MHZ and 12.5 MHZ respectively.

In addition, NICDE (non-interlaced composite display enable) provides an indication as to the clock cycles during which valid pixel data elements representing the non-interlaced image should be received. Accordingly, write buffer control 540 generates signals on line 543 to enable write-buffer 530 to receive data from demultiplexor 510 as explained below in further detail. Write buffer control 540 sends a write request to arbiter 520 on line 524, which ensures there are no conflicts with read operations to line buffer 550.

As to the write operation into line buffer 550, write buffer 530 comprises two portions 531 and 532, with each portion designed to store a pixel data element. Once stored, the two pixel data elements are forwarded to line buffer 550. In another embodiment, data is stored into and retrieved from line buffer 550 in units of five pixel data elements. Accordingly, write buffer 530 (and read buffer 560) may comprise five portions. Demultiplexor 510 operates to multiplex pixel data elements received from flicker filter 480 into the two portions 531 and 532 under the control of multiplexor selector line 541 asserted by write buffer control 540. Write buffer control 540 generates the control signals to write-buffer 530 and demultiplexor 510 to coordinate and control the respective operations. Write buffer control 540 also drives tri-state buffer 590 to a high-impedance state when data is read from line buffer 550.

As to the read operations, read buffer 560 can include two portions 561 and 562, each for storing a pixel data element. When the first two pixel data elements of a line are available in write buffer 530, the two pixel data elements are directly transferred to read buffer 560. This is done to pre-fill read buffer 560 and keep the first two data pixels ready for display. Subsequent pixels to read buffer 560 are transferred from line buffer 550. Read buffer control 570 generates the control signals to coordinate and control the read operations.

The signals generated by read buffer control 570 further operate to serialize the pixel data elements stored in portions 561 and 562. That is, read buffer control 570 generates appropriate values on signal line 578 to cause one of the two pixel data elements stored in read buffer 560 to be provided as output on line 174. Signal line 578 is asserted such that the earlier pixel data element in the scan order is selected first.

Arbiter 520 arbitrates between read and write requests. Such arbitration may be required to avoid race conditions and as line buffer 550 may be implemented as a single-ported RAM. In general, if there is a conflict, arbiter 520 can provide higher priority to write requests as read transactions are received at lower frequency during interlaced mode of provision of data. Thus, in situations of conflict, read operations may be serviced during an immediately following clock cycle. By having two portions in read buffer 570, starvation may be avoided. That is, data will be provided continuously at a desired rate for generating display.

The operation of the individual components are controlled and coordinated (synchronized) by signals from timing signals generator 499. The relationship between the timing signals in an example embodiment are illustrated with reference to timing diagrams below.

6. Timing Diagrams

Figure 6A:
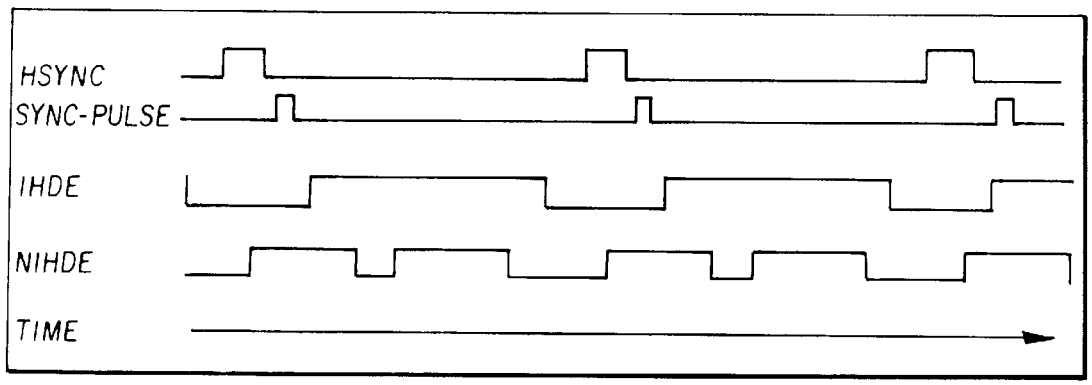
FIGS. 6A and 6B illustrate the timing relationships between various signals that control the operation flow of interlacer in one embodiment.
Figure 6B:
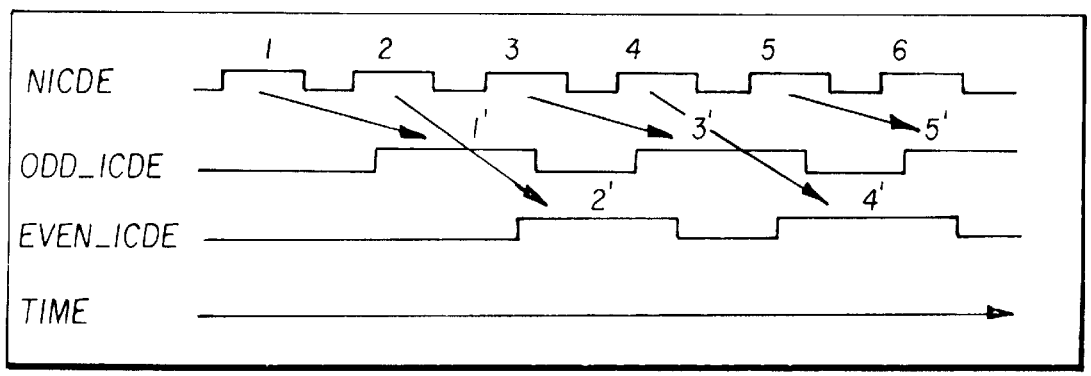

FIGS. 6A and 6B illustrate the timing relationship between various signals that control the operation flow in one embodiment of the present invention. Specifically, FIGS. 6A and 6B respectively illustrate the horizontal and vertical timing relationships. The signals in each Figure are explained in detail below.

With reference to FIG. 6A HSYNC signal refers to the horizontal synchronization signal extracted from the received composite television signal. SYNC-PULSE is generated in a known-way and is used to genlock the signals including 1VLCK and 2VCLK signals to the trailing edge of HSYNC. IHDE (interlaced horizontal display enable) signal controls the timing of the display of each horizontal line on television display screen 150. NIHDE (non-interlaced horizontal display enable) signal controls the timing of the flow of individual pixel data elements in a horizontal line. Horizontal display enable signals typically indicate the time during which valid data is present for subsequent processing. The NIHDE signal has to be ahead of the IHDE by sufficient VCLK clock cycles such that enough data is already in the interlacer buffer when IHDE starts. VCLK genlocked to HSYNC is used to generate both the waveforms.

With reference to FIG. 6B, NICDE signal controls the flow of data in network application data path 340, flicker filter 480, and interlacer 490 as explained above. The horizontal lines (numbered 1–6) of each frame are processed during each period when the signal is at a logical high. The horizontal lines are referred by numbers 1–6 for illustration. The ICDE signal is represented by odd_ICDE and even_ICDE signals respectively when odd and even frames are processed. As can be appreciated, the pixel data elements generated from interlacer 490 have different values compared to pixel data elements provided as input to flicker filter 480 due to the filtering operation. Accordingly, the lines corresponding to NICDE are shown without prime symbol ('), while the corresponding filtered data is shown with a prime symbol. Also, the CDE signals are generated to ensure that the display signals generated from the pixel data elements are received at a time corresponding to corresponding portions of the television display signal portion at multiplexor 140.

Thus, interlacer 490 can be designed to provide pixel data elements representing an interlaced using buffer 550. Also, flicker filter 480 provides the input pixel data elements to interlacer 490. Flicker filter 480 can also include internal memory for filter operation. Using separate memory units for flicker filter 480 and interlacer 490 can be expensive. Accordingly, flicker filter 490 can be integrated with interlacer 490 in accordance with the present invention.

7. Present Invention

Figure 2:
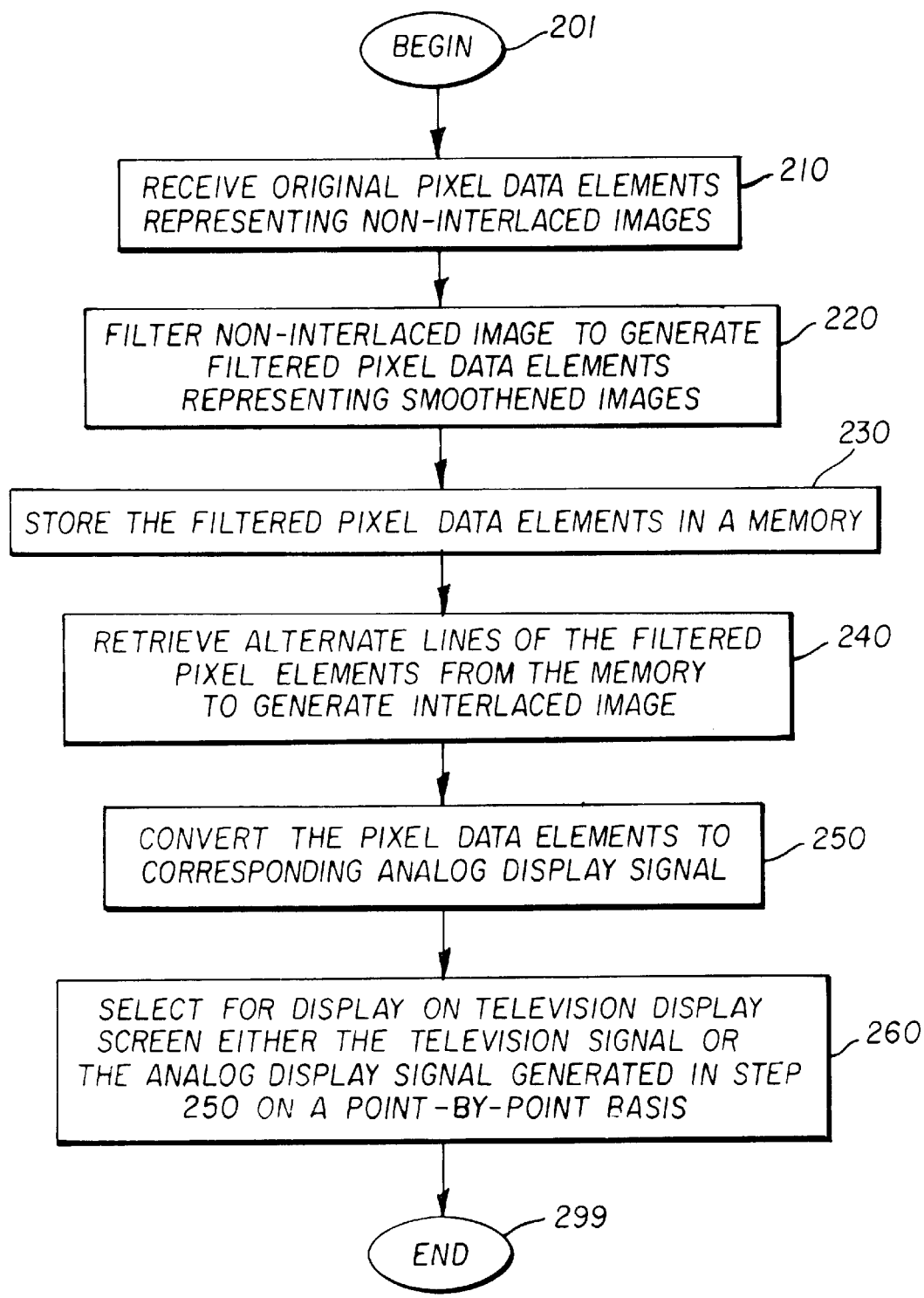
FIG. 2 is a flow chart illustrating the method of the present invention.

FIG. 2 is a flow chart illustrating the steps performed in accordance with the present invention. In step 210, network application data is received. In one embodiment, pixel data elements representing the network application data are stored in a memory, and the stored pixel data elements are retrieved during step 210. The retrieved pixel data elements represent network application data images in a non-interlaced (progressive scan mode) mode. In step 220, a filtering operation is performed using the original pixel data elements to generate filtered pixel data elements. The filtered pixel data elements represent non-interlaced images, but without sharp transitions.

In step 230, the filtered pixel data elements are stored in a memory. In step 240, alternate lines of the non-interlaced image are retrieved from the memory. The alternate lines represent interlaced images. Steps 210, 220, 230 and 240 can be performed in one of several ways as will be apparent to one skilled in the relevant arts by reading the description provided herein. The manner in which steps 210, 220, 230 and 240 can be performed in an example environment is described below in detail.

In step 250, the filtered pixel data elements representing interlaced images are converted to analog signals. In step 260, either the television signal or the analog signal generated in step 250 is selected for display. The manner in which steps 250 and 260 are performed will be apparent to one skilled in the relevant arts based on the description herein.

Thus, a single memory can be used for performing both the filtering and interlacing operations. Several implementations will be apparent to one skilled in the relevant arts by reading the description herein. An example architecture and an implementation based on the architecture will be explained below. For clarity, architecture of flicker filter 480 will be explained first. The manner in which flicker filter 480 can be integrated with interlacer to use a single memory unit will be explained with reference to a timing diagram.

8. Flicker Filter 480

Figure 7:
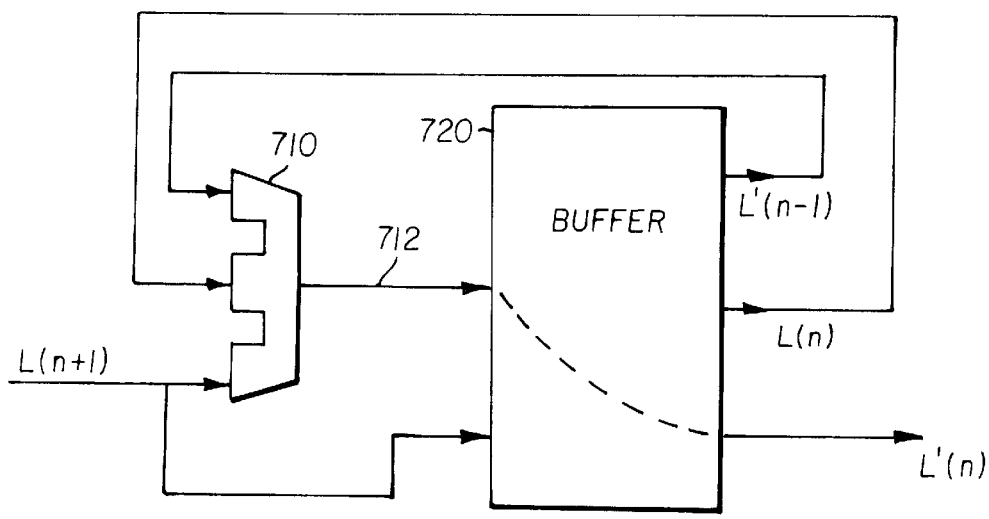
FIG. 7 is a block diagram illustrating the architecture of a flicker filter in one embodiment of the present invention.

FIG. 7 is a block diagram illustrating the architecture of flicker filter 480 in one embodiment of the present invention. As will be clear from the description below, the same architecture and operation can be extended to integrate interlacer 490 in the same circuit. Broadly, flicker filter 480 is implemented using infinite impulse response (IIR) filter in one embodiment. Flicker filter 480 can be implemented using a small memory as the embodiment needs to store only two horizontal lines of data at any given time. Thus, buffer 720 includes sufficient memory to store two horizontal lines of network application data. In one embodiment, buffer 720 is implemented as a random access memory (RAM) for superior performance.

In the description here, a present line of the interlaced image available for display will be denoted by 'n'. It should be understood only alternate lines may be actually provided for display as images may be displayed in interlaced format. L() refers to the lines being retrieved from memory module 180 and L'() refers to the weighted average of the adjacent lines (filtered lines) generated using a filter. Filtered lines L'() are sent for display. As a displayed line L'(n) may correspond to a previously retrieved line, a presently being retrieved line will be referred to as L(n+1). Thus, in the description herein, the lines retrieved from memory module will be referred to as L(n+1), while the lines being provided for display will be referred to as L'(n). Also, lines L(n+1) and L'(n+1) become lines L(n) and L'(n) respectively during a next horizontal period.

In addition, filter 710 of one embodiment uses a present line L'(n) available for display, a present line being retrieved L(n+1), and a previous retrieved line L(n) for generating the next line available for display. During the next horizontal line cycle (e.g., defined by next HSYNC signal of television signal), the generated line will be made available for display. Even though filter 710 is described as operating a present and a previous horizontal line, it should be understood that filter 710 may be implemented to store several additional adjacent lines (and L' lines) and use some or all of these lines for filtering. Further, the filtering scheme can be extended to include horizontal filtering also even though the embodiments described here include only vertical filtering.

As will be appreciated, lines generated for display are generated based on several previous line because of the recursive definition of L' lines. That is, as a L' line is used for generating the next L' line, all the previous lines may contribute to the displayed lines. As all previous lines of a frame may contribute to the a presently displayed line, an IIR filter is said to be used.

In one embodiment, line L'(n) is generated by using the equation:

$$L'(n) = k1 \times L'(n-1) + k2 \times L(n) + k3 \times L(n+1) \qquad \text{Eq. 1}$$

wherein $$k1 + k2 + k3 = 1 \qquad \text{Eq. 2}$$

In general, the values of k1, k2, and k3 are chosen such that $$k3 > k2 > k1 \qquad \text{Eq. 3}$$

Eq. 3 has the effect of having L(n+1) have most effect on (or contribute most to) the generated line provided for display and L' has the least effect. When k3=1, no filtering action is performed and a retrieved line is provided for display. As the values of k1 and k2 approach k3, the filtering effects are pronounced, and the displayed images may have less sharpness (i.e., blurred). The values of k1, k2, and k3 need to be chosen so as to balance the sharpness and flicker removal requirements.

The values k1, k2, and k3 can be different for each color. Assuming the final image is generated from red, green, and blue components, the flicker effects are more pronounced (on the human eye) with the green color and least pronounced with the blue color. Accordingly, green color may be filtered most (i.e., large value of k3) and blue can be filtered least. The different levels of filtering can be used to further balance out the sharpness and filtering requirements.

Once generated, the filtered pixel data elements for lines L' are stored in buffer 720. In addition, buffer 720 can store any adjacent lines used for filtering also. In the embodiment of FIG. 7, buffer 720 stores one previous line and one previous filtered line in addition to the presently being received original line and the presently being generated filtered line. The pixel data elements are provided to filter 710 for generating filtered pixel data elements, which can be used for display. The details of operation will be clearer with the description below.

9. Example Implementation of Flicker Filter

Figure 8:
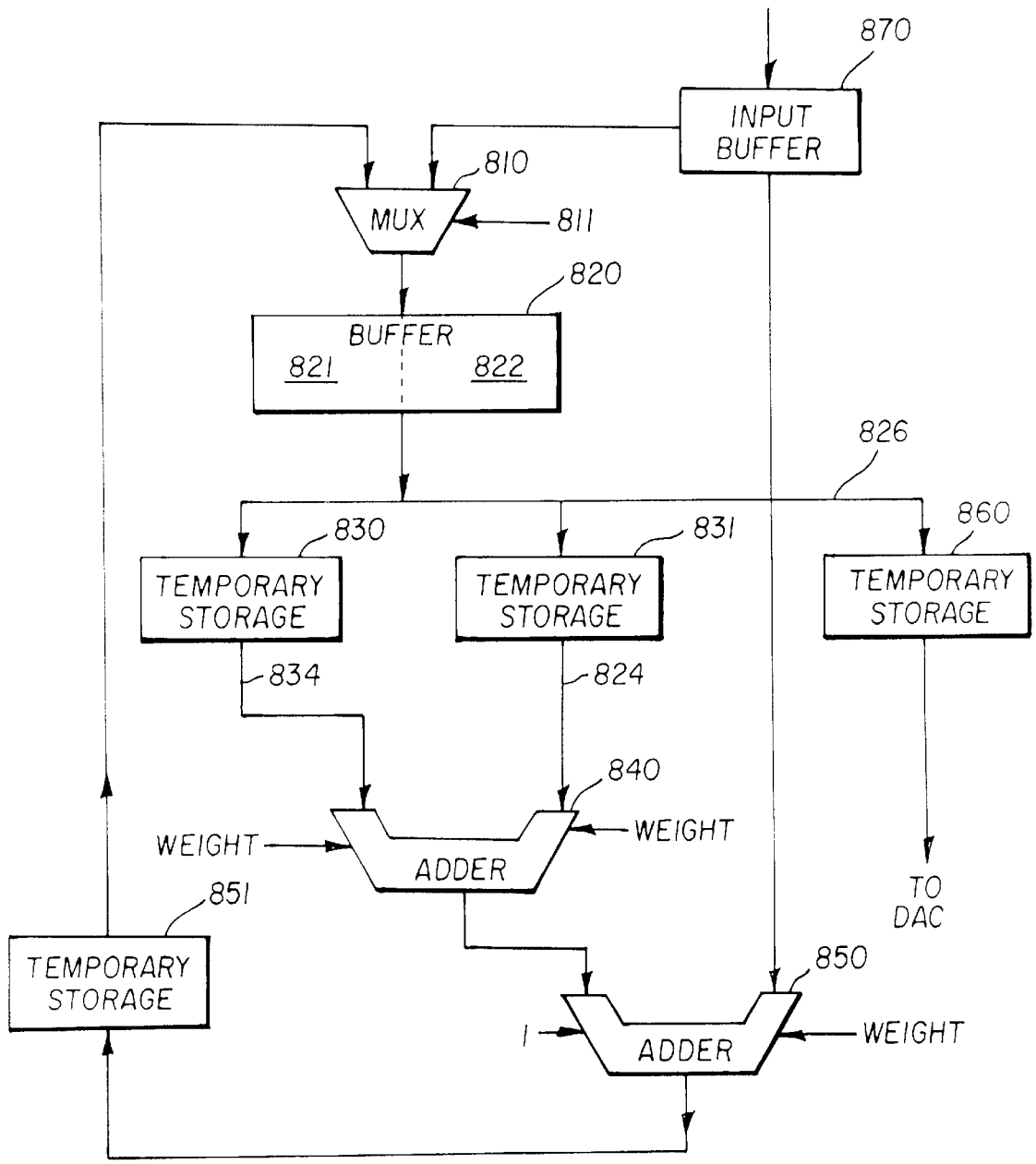
FIG. 8 is a block diagram illustrating an example implementation of flicker filter in an embodiment of the present invention.

FIG. 8 is a block diagram illustrating an example implementation of flicker filter 480. Flicker filter 480 may include multiplexor (mux) 810, buffer 820, temporary storage 830, weighted adders 840, 850, temporary storages 830, 831, 851 and 860 and input buffer 870. Buffer 820 may correspond to Buffer 720 of FIG. 7. In one embodiment, buffer 820 is implemented as a single-ported memory. As buffer 820 may present bottlenecks, data is read from (and written into) buffer 820 in units of five pixel data elements.

Input buffer 870 receives and buffers pixel data elements from memory 180, and provides the data elements in units of five pixel data elements each time. Temporary storages 830, 831, 851 and 860 enable buffer 820 to operate in units of five pixel data elements. Mux 810 controls whether data is written into buffer 820 from adder 850 or from input buffer 870. One value on line 811 causes data from input buffer 870 to be written into buffer 820 and another value causes data from temporary storage 851 to be written.

Buffer 820 includes two portions 820 and 821, with each portion having sufficient memory storage to store a horizontal line of pixel data elements. As will be explained, data is stored and retrieved in accordance with the present invention such that additional memory storage may not be required in buffer 820. Buffer 820 stores the pixel data elements received from input buffer 870 and filtered pixel data elements from adder 850, all via multiplexor 810.

Buffer 820 provides L'(n) for display in an interlaced mode, L' (n−1) for computation of the next line to be displayed, and L (n) stored during a previous HSYNC period. To avoid any potential bottlenecks as a result of these multiple read accesses, temporary storage 830 and temporary storage 860 are provided to store five pixel data elements. Pixel data elements of L' (n) are provided for display to temporary storage 860. Temporary storage 860 receives five pixel data elements, and provides each pixel data element to DAC 175 (of FIG. 1). It may be noted that all the components shown in FIG. 8 except temporary storage 860 operate at twice the clock speed compared to temporary storage 860. Pixel data elements are retrieved from temporary storage 860 at the slower clock speed, and provided to DAC. Accordingly, the data elements are provided at a slower clock speed corresponding to the interlaced format.

Buffer 820 forwards original pixel data elements (in units of five elements) for each line (L(n)) to weighted adder 840 when original pixel data elements for a subsequent line are being received. Temporary storage 830 receives and stores the five pixel data elements of each line. Buffer 820 forwards pixel data for lines L'(n−1) also to weighted adder 840 in units of five pixel data elements.

Weighted adder 840 receives pixel data elements of line L (n−1) on line 834 and filtered pixel data elements of line L' (n−1) on line 824. Weighted adder 840 generates (k1×L'(n−1)+k2×L(n)). The output of weighted adder 840 is provided on line 845 to weighted adder 850, which adds k3×L (n+1) received from input buffer 870 to generate a new filtered line according to Eq.s 1–3 noted above. As noted above, k1, k2, and k3 can be stored in programmable registers, and can be different for each color. Pair of weighted adders 840 and 850 can be provided for each color. Also, more filtered lines or more adjacent lines can be used to achieve the filtering operation as will be apparent to one skilled in the relevant arts based on the description herein.

The output of weighted adder 850 is stored in buffer 820 for generating subsequent display lines. As noted above buffer 820 may include storage space to store only two lines of pixel data elements. In addition, the filtered pixel data elements can be retrieved in accordance with the present invention such that the retrieved pixel data elements represent the interlaced images. Accordingly, interlacer 490 can be integrated with flicker filter 480 to share one memory unit as will be clear with the description below.

Figure 9:
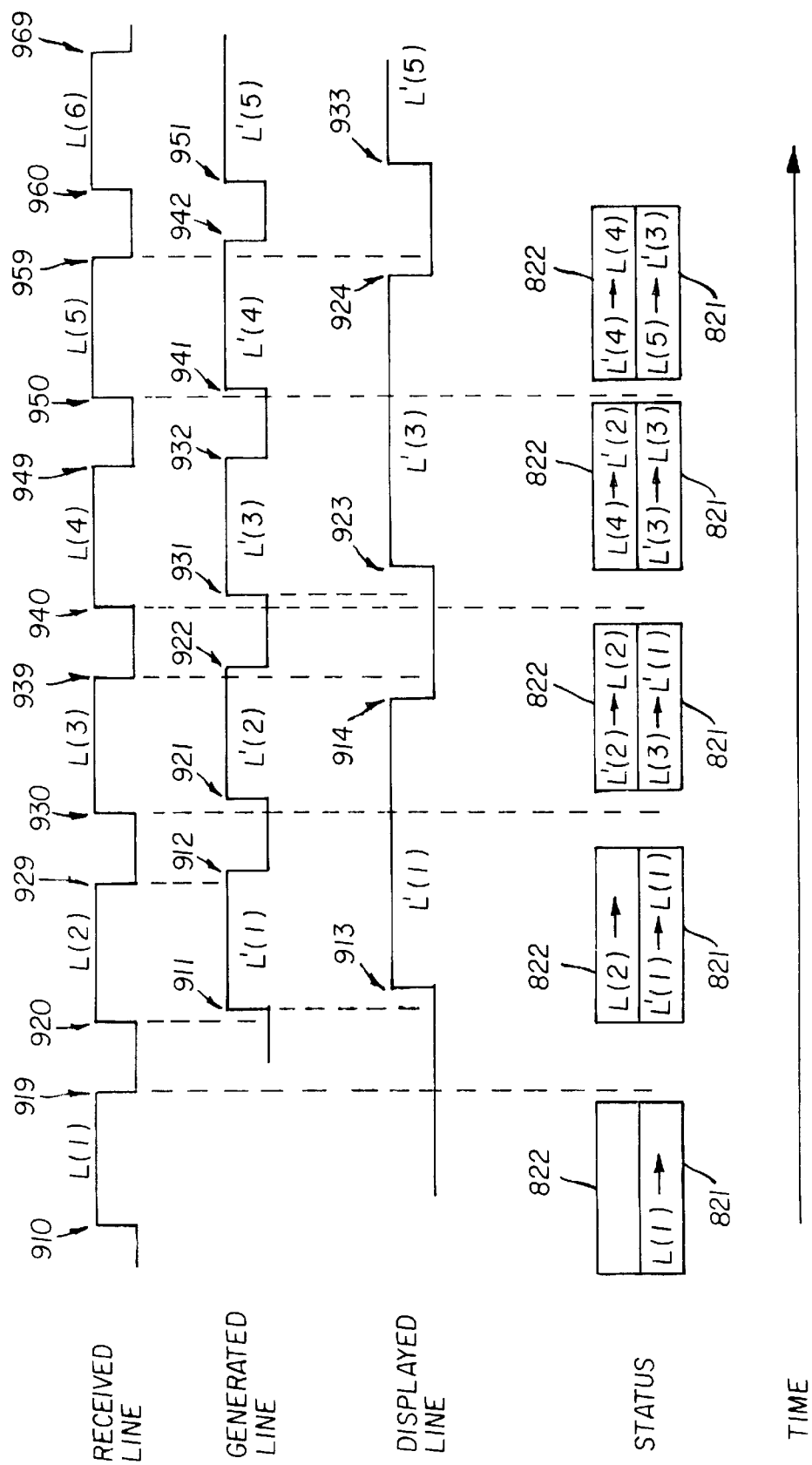
FIG. 9 is a timing diagram illustrating the manner in which interlacer and flicker filter can be integrated to use a single memory unit.

10. Timing Diagram Illustrating the Integration of Flicker Filter and Interlacer FIG. 9 is a timing diagram illustrating the timing relationship between the use and generation of lines L and L' in one embodiment. The timing diagram includes RECEIVED LINE L(n+1), GENERATED LINE L'(n), DISPLAYED LINE L'(n), and Buffer STATUS indicating the status of two portions 821 and 822 of buffer 820 as various lines are received and processed. In the description of each portion 821 and 822, symbol −>> indicates that the line on left continuously replaced the line on right. For example, "L(3) −−> L'(1)" means that line L(3) replaces line L'(1) during the corresponding time interval.

Line L(1) is shown received between points 910 and 919. The pixel data elements of L(1) are stored in portion 821 as shown at Buffer STATUS between points 910 and 919. Line L(2) is received between points 920 and 929 and stored in portion 822. In parallel, starting at point 911 (which is after point 920 as a function of time), filtered pixel data elements of line L'(1) are computed from lines L2 and L1. Filtered pixel data elements L'(1) are stored in portion 821 while line L(2) is stored in portion 822. Even though L'(1) replaces L(1), it should be noted that only the original pixel data elements that have already been used for display and for filter operation are replaced. Thus, before the beginning of reception of line L(3) at point 930, portion 821 stores L'(1) and portion 822 stores line L(2).

Line L(3) is received between points 930 and 939. In parallel, line L'(2) is generated from lines L(3) (provided directly from input buffer 870 to adder 850 in FIG. 8), L(2) and L(1). L'(2) replaces L(2) in portion 822 as the corresponding filtered pixel data elements are generated. L(3) replaces L'(1) as the original pixel data elements are received.

The filtered pixel data elements of line L'(1) are provided for display between points 913 and 914. This provision operates using half the clock rate (1VCLK of FIG. 4) as at which the original pixel data is processed (2VCLK) to generate the filtered pixel data. Due to the slower speed, the pixel data elements can be provided at interlaced rate. Even though there is overlap between the display time of L'(1) and the time during which L'(1) is replaced by L(3), it should be noted that the display starts much ahead of the replacement. In addition, the display end point 914 is designed to be ahead of point 939 at which the last pixel data element of line L(3) is received. Accordingly, the pixel data elements required for display are preserved until they are forwarded for display.

Line L(4) is received between points 940 and 949. In parallel, line L'(3) is generated from lines L(4), L(3), and L'(2). L(4) replaces L'(2) in portion 822 and L'(3) replaces L(3) in portion 821. The generation and replacement of lines L'(3), L'(4) and L'(5) is explained similar to above. The status of portions 821 and 822 is also explained similar to above. In general, L'(n) replaces L(n), and L(n+1) replaces L'(n).

Thus, from the description of FIG. 9, it will be appreciated that filtered pixel data elements can be retrieved from buffer 820 at an interlaced rate. The retrieved pixel data elements represent interlaced images of network application data stored in memory. Accordingly, buffer 820 of FIG. 8 can be provided as line buffer 550 of FIG. 5, and the two circuits of FIGS. 5 and 7 can be integrated as will be apparent to one skilled in the relevant arts based on the description herein.

As a shared memory unit may be used by interlacer 490 and flicker filter 480, the overall cost of the television system 100 may be minimized. In addition, as all the horizontal lines of the network application data image are used for filtering, sharp transitions are reduced. As a result, flicker may be substantially reduced in the final network application data display on television display screen 150. In addition, as the filtered data is provided in an interlaced format, it is well-suited for display on interlaced displays of display screen 150.

11. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A television system for displaying network application data on a display unit supporting interlaced display format, said television system comprising:

an interface for receiving a plurality of original pixel data elements representing a non-interlaced image of said network application data, wherein said interlaced image includes a plurality of lines;

a filter coupled to said interface for receiving said plurality of original pixel data elements, said filter performing a filtering operation using at least one of said plurality of lines and a previously generated filtered line to generate a filtered line, wherein a plurality of filtered lines including said filtered line represent a smoothened image of said interlaced image, and wherein said filtered line is used as a previously generated filtered line for generating a subsequent filtered line;

a buffer coupled to said filter for storing said plurality of filtered lines generated by said filter such that said stored filtered line is available as said previously generated filtered line for generating said subsequent filtered line; and a display interface for receiving alternate lines of said plurality of filtered lines from said buffer, said display interface generating display signals for said display unit according to said received alternate lines, wherein said alternate lines form an interlaced image of said network application data, whereby said network application data is displayed on said display unit with minimal flicker.

2. The television system of claim 1, wherein said filter comprises an infinite impulse response filter.

3. The television system of claim 1, wherein said buffer includes sufficient memory to store two lines of pixel data elements.

4. The television system of claim 3, wherein said buffer stores original pixel data for one adjacent line and filtered pixel data for one filtered line.

5. The television system of claim 1, wherein said interface is designed to receive said original pixel data elements from a memory module.

6. The television system of claim 1, wherein said buffer stores original pixel data for one adjacent line and filtered pixel data for one filtered line, and wherein said filter uses said one adjacent line and said filtered line to generate a new filtered line.

7. A television system including a display unit for displaying network application data, wherein said display unit is designed to display images in an interlaced format, said television system comprising:

means for receiving a plurality of original pixel data elements representing a non-interlaced image of said network application data, wherein said non-interlaced image includes a plurality of lines;

means for filtering said non-interlaced image by processing said original pixel data elements to generate a plurality of filtered pixel data elements, wherein said step of filtering uses at least one of said plurality of lines and a previously generated filtered line to generate a filtered line, wherein a plurality of filtered lines represent a smoothened image of said interlaced image;

means for storing each of said filtered lines;

means for providing each of said filtered lines stored in said means for storing as a previously generated filtered line to said means for filtering to generate said plurality of filtered lines;

means for retrieving alternate lines of said plurality of filtered lines from said buffer, wherein said alternate lines form an interlaced image of said network application data; and means for generating display signals for said display unit according to said alternate lines retrieved by said means for retrieving, whereby said network application data is displayed on said display unit with minimal flicker.

8. A method of displaying network application data on a display unit of a television system, wherein said display unit is designed to display images in an interlaced format, said method comprising the steps of:

(a) receiving a plurality of original pixel data elements representing a non-interlaced image of said network application data, wherein said non-interlaced image includes a plurality of lines;

(b) filtering said non-interlaced image by processing said original pixel data elements to generate a plurality of filtered pixel data elements, wherein said step of filtering uses at least one of said plurality of lines and a previously generated filtered line to generate a filtered line, wherein a plurality of filtered lines represent a smoothened image of said interlaced image;

(c) storing each of said filtered lines generated in step (b) in a buffer;

(d) providing each of said filtered lines stored in step (c) as a previously generated filtered line for step (b) to generate said plurality of filtered lines;

(e) retrieving alternate lines of said plurality of filtered lines from said buffer, wherein said alternate lines form an interlaced image of said network application data; and (f) generating display signals for said display unit according to said alternate lines retrieved in step (e), whereby said network application data is displayed on said display unit with minimal flicker.

* * * * *